(12) United States Patent
Jesorka et al.

(10) Patent No.: US 11,243,189 B2
(45) Date of Patent: Feb. 8, 2022

(54) SURFACE ACOUSTIC WAVE RESONANT SENSOR

(71) Applicants: Aldo Jesorka, Gothenburg (SE); Kiryl Kustanovich, Gothenburg (SE); Ventislav Mitkov Yanchev, Vratsa (BG)

(72) Inventors: Aldo Jesorka, Gothenburg (SE); Kiryl Kustanovich, Gothenburg (SE); Ventislav Mitkov Yanchev, Vratsa (BG)

(*) Notice: Subject to any disclaimer, the term of this patent is extended or adjusted under 35 U.S.C. 154(b) by 70 days.

(21) Appl. No.: 16/615,356

(22) PCT Filed: May 30, 2018

(86) PCT No.: PCT/SE2018/050542
§ 371 (c)(1),
(2) Date: Nov. 20, 2019

(87) PCT Pub. No.: WO2018/222119
PCT Pub. Date: Dec. 6, 2018

(65) Prior Publication Data
US 2020/0200712 A1    Jun. 25, 2020

(30) Foreign Application Priority Data
May 30, 2017  (SE) .................... 1750678-3

(51) Int. Cl.
*G01N 29/036* (2006.01)
*G01N 29/02* (2006.01)
*G01N 29/24* (2006.01)

(52) U.S. Cl.
CPC ......... *G01N 29/036* (2013.01); *G01N 29/022* (2013.01); *G01N 29/2462* (2013.01);
(Continued)

(58) Field of Classification Search
CPC .............. G01N 29/036; G01N 29/022; G01N 29/2462; G01N 2291/022;
(Continued)

(56) References Cited

U.S. PATENT DOCUMENTS

| 5,130,257 A | 7/1992 | Baer et al. |
| 5,283,037 A * | 2/1994 | Baer .................... G01N 29/022 310/311 |

(Continued)

FOREIGN PATENT DOCUMENTS

JP    2017130975    7/2017

OTHER PUBLICATIONS

Mousavi et al., "Design and simulation of one-port SAW resonator for wireless and high temperature application", IEEE International Conference on Semiconductor Electronics 2008, ICSE Malaysia 2008, (Nov. 25, 2008), XP031415368 [A] 1-18.

(Continued)

*Primary Examiner* — Lisa M Caputo
*Assistant Examiner* — Rose M Miller
(74) *Attorney, Agent, or Firm* — Duane Morris LLP; Gregory M. Lefkowitz; Randall C. Pyles

(57) ABSTRACT

A surface acoustic wave resonant sensor for measuring a sample comprising a single port surface acoustic wave (SAW) resonator comprising an interdigital transducer and at least one reflective grating. The sensor is provided with a region for receiving the sample, said region being in communication with the at least one reflective grating and the IDT is separated acoustically and electrically from the region for receiving a sample such that the IDT is not mass sensitive to the sample. The sensor is especially suitable for bio sensing applications.

18 Claims, 6 Drawing Sheets

(52) U.S. Cl.
CPC ............... *G01N 2291/022* (2013.01); *G01N 2291/0422* (2013.01); *G01N 2291/0423* (2013.01); *G01N 2291/106* (2013.01)

(58) Field of Classification Search
CPC ..... G01N 2291/0423; G01N 2291/106; G01N 2291/0422
USPC .......................................................... 73/579
See application file for complete search history.

(56) References Cited

U.S. PATENT DOCUMENTS

| 2014/0144237 A1* | 5/2014 | Komatsu ............... G01N 29/12 |
| | | 73/579 |
| 2015/0000414 A1* | 1/2015 | Yoshimura ............. G01H 11/08 |
| | | 73/649 |
| 2015/0111765 A1* | 4/2015 | Laury-Kleintop ..... G01N 29/36 |
| | | 506/9 |

OTHER PUBLICATIONS

Hohmann, S. et al., "Surface Acoustic Wave (SAW) Resonators for Monitoring Conditioning Film Formation", Sensors (Basel, (May 21, 2015), vol. 15, No. 5, pp. 11873-11888, XP055562956 [A] 1-18 * ; pp. 11876-11877.
Krishnan et al., "Simulation of One-Port SAW Resonator using COMSOL Multiphysics", Proceedings of the COMSOL Users Conference 2006 Bangalore, India, XP055562963 [A] 1-18.
Grate & Fry, "Acoustic Wave Sensors", Sensors update, (Jan. 1, 1996), pp. 37-83, XP002205093 [T] 1-18; Sections 2.2.5-2.2.7.

\* cited by examiner

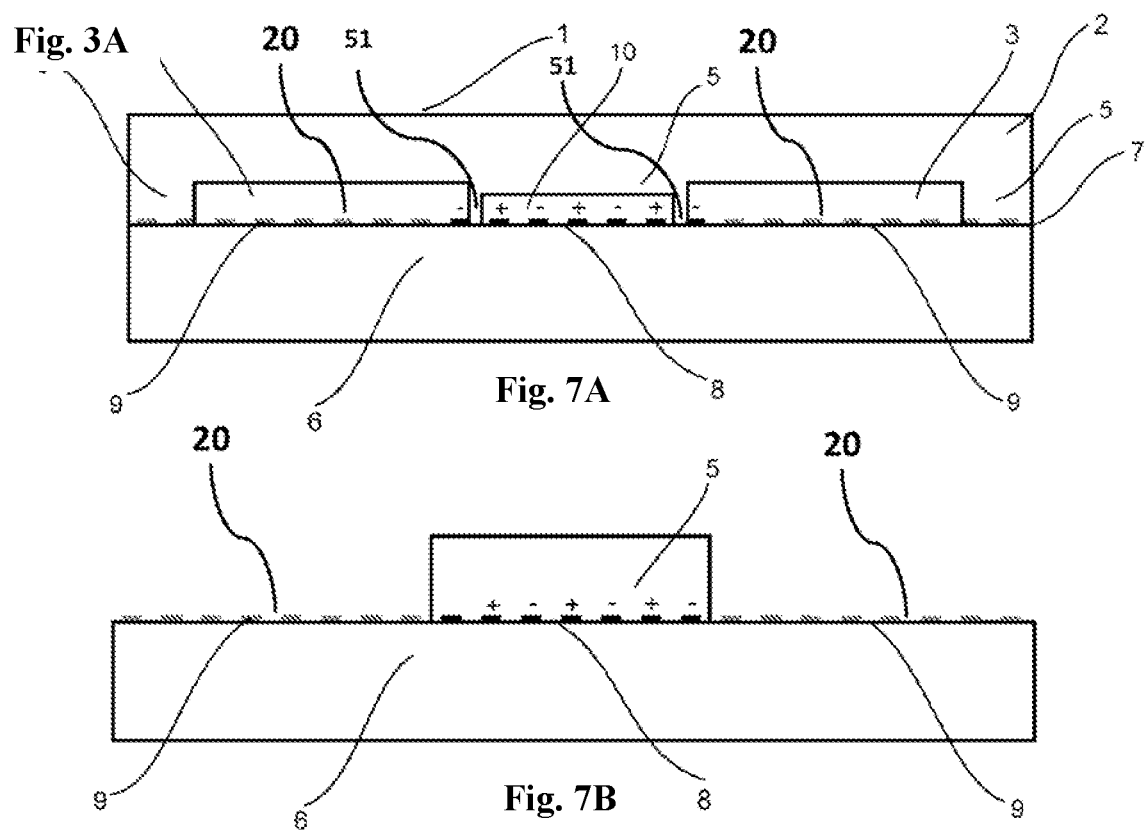
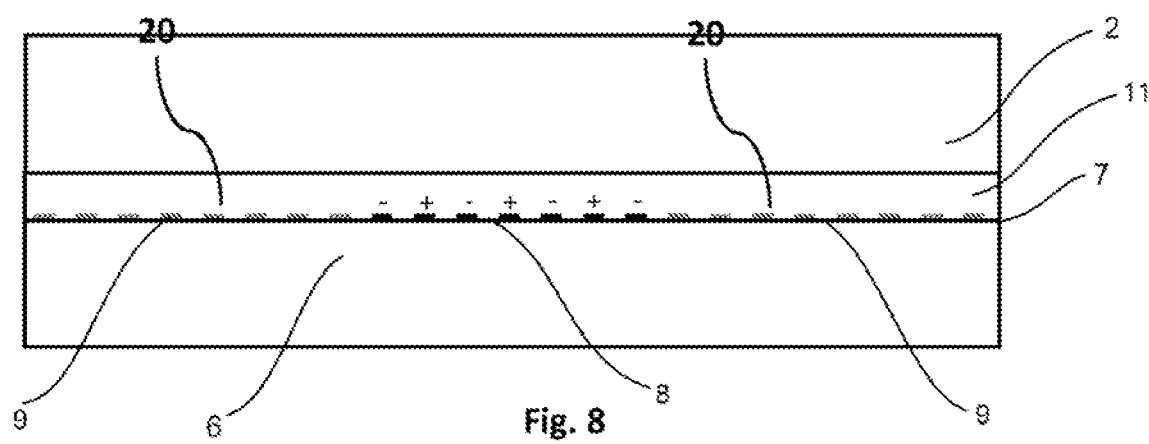

SURFACE ACOUSTIC WAVE RESONANT SENSOR

CROSS-REFERENCE TO RELATED APPLICATIONS

This application is a § 371 national stage entry of International Application No. PCT/SE2018/050542, filed May 30, 2018, which claims priority of Swedish National Application No. 1750678-3, filed May 30, 2017, the entire contents of which are incorporated herein by reference.

FIELD OF THE INVENTION

The present disclosure relates to a surface acoustic wave sensor suitable for chemical, biological, or physical sensor applications. Specially, the disclosure relates to a surface acoustic wave resonant sensor comprising a single port surface acoustic wave (SAW) resonator.

BACKGROUND OF THE INVENTION

Chemical, biological and physical sensing relates to the determination of the detectable presence, concentration, or quantity of a given chemical or biochemical analyte, or biological entity, or physical stimulus. Chemical or biochemical analytes comprise, but are not limited to, organic and inorganic molecules. Biological entities comprise, but are not limited to, microorganisms, biological cells, subcellular structures, and biological tissue. Physical stimuli include, but are not limited to, mass changes, pressure changes, elasticity changes, viscosity changes, density changes, or changes in electric properties.

The most common resonant acoustic wave biosensor is the Quartz Crystal Microbalance (QCM), offering single-port frequency measurements in the range of about 10 MHz or below. Quartz crystal microbalance (QCM), employs the thickness shear bulk acoustic wave in thin quartz plates. The sensing events take place on the electrically grounded surface of the plate, while the opposite plate surface with its signal electrode is completely isolated from the liquid. In other previously developed examples in the context of integrated sensor arrays for operation up to the GHz frequency range, high frequency alternatives of the QCM were proposed, employing ZnO and AlN thin films with tilted x-axis orientation, (I. Katardjiev and V. Yantchev, "*Recent developments in thin film electro-acoustic technology for biosensor applications*", Vacuum, Vol. 86, Issue 5, pp. 520-531, 2012]. Despite the promising feature demonstrated, this technology found limited use because of the technological complexities related to the synthesis of c-axis tilted piezoelectric films with appropriate thickness, functional uniformity, and low residual stresses.

Surface-launched acoustic wave devices may be utilised to detect and quantify numerous measurements by means of perturbations induced in the electrical and mechanical properties of the devices by the analyte, biological entity, or physical stimulus to be measured.

A classical implementation for the shear surface acoustic wave (SH-SAW) biosensor is a delay line configuration as found in U.S. Pat. No. 6,378,370 B1 (Sensor Res and dev Corp, 2002 Apr. 30) and U.S. Pat. No. 7,716,986 B2 (industrial Technology Research Institute. 2010 May 18). The delay line biosensor comprises a piezoelectric substrate. A first input SAW transducer excites SAWs. A second SAW transducer placed along the axis of SAW propagation at a defined distance from the input SAW transducer receives the emitted SAW and converts the acoustic signal back to an electrical signal. Both SAW transducers are protected from the high dielectric permittivity and conductivity of the liquids by a protective cap/layer. Sensor response is represented either as shift in the SAW delay time, shift in the transmission loss or as phase shift between the exciting and the receiving SAW transducers, or as combination of the above.

SH-SAW delay line biosensors are characterized by large insertion losses (i.e., strong signal loss in transmission) emanating from the significant SH-SAW damping in the liquid substrate along the delay path between the two SAW transducers. The longer the delay path, the stronger the damping. Another source of losses stems from the bidirectionality of the classical SAW interdigital transducers (IDTs).

In an attempt to simplify sensor measurements, liquid phase sensors with two-port resonant topology were proposed (S. Hohmann et al, "*Surface Acoustic Wave (SAW) Resonators for Monitoring Conditioning Film Formation*" Sensors, vol. 15, pp. 11873-11888, 2015). In this implementation, two IDTs complemented by a reflective periodic grating at the outer side with respect to the delay cavity, are placed close to each-other for lower-loss transmission. This approach enables the measurement of the resonance frequency in transmission, but still suffers from significant transmission losses when immersed in liquid. Furthermore, the proposed topology is fully immersed in liquid, thus making the transducers susceptible to the short-circuiting effect of an electrically conductive liquid.

Plate guided modes including the shear plate acoustic mode (SHAPM), the flexural plate wave (FPW), the lowest order symmetric (S0) and antisymmetric (A0) Lamb waves are also suitable for the design of one-port resonant sensors operating in liquid environment. The plate geometry itself enables natural separation between transducer and liquid environment by using the two opposite plate faces for transduction and sensing, respectively (T. Mirea at al, "*Influence of liquid properties on the performance of S0-mode Lamb wave sensors II: Experimental Validation*" Sensors and Actuators B, Vol. 229, pp 331-337, 2016).

Due to the benefits in comparison to earlier developments, a one-port SAW resonant sensor topology, suitable for in-liquid sensing and mass production, is of high value for the development of miniature and robust biochemical sensor applications.

SUMMARY OF THE INVENTION

Accordingly, the present invention preferably seeks to mitigate, alleviate or eliminate one or more of the above-identified deficiencies in the art and disadvantages singly or in any combination and solves at least the above mentioned problems by providing a surface acoustic wave resonant sensor for measuring a sample comprising a single port surface acoustic wave (SAW) resonator comprising an interdigital transducer (IDT) and at least one reflective grating. The sensor is provided with a region for receiving the sample, said region being in communication with the at least one reflective grating. The IDT is separated acoustically and electrically from the region for receiving a sample such that the IDT is not mass sensitive to the sample. The sensor is especially suitable for bio sensing applications.

A sensor assembly is also provided.

A system for measuring a sample is also provided.

Furthermore, a method for physical, biological and/or physical measurement is provided.

Further advantageous embodiments are disclosed in the appended and dependent patent claims.

BRIEF DESCRIPTION OF THE DRAWINGS

These and other aspects, features and advantages of which the invention is capable will be apparent and elucidated from the following description of embodiments of the present invention, reference being made to the accompanying drawings, in which

FIG. 7A-B show cross-sectional views of a sensor according to aspects of the invention.

FIG. 8 shows a cross-sectional view of a sensor according to an aspect of the invention.

DETAILED DESCRIPTION

Figure 1:
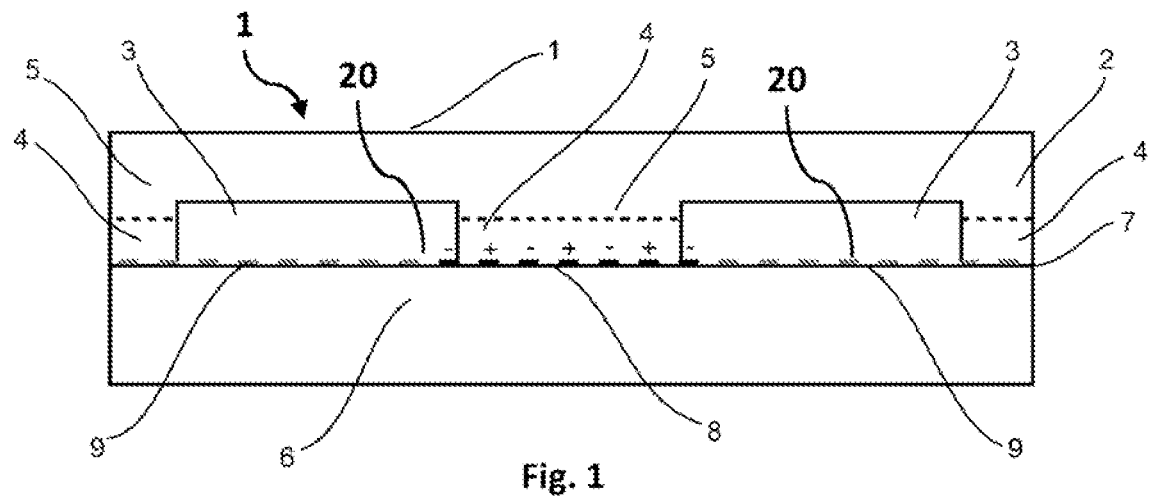
FIG. 1 is a cross-sectional view of a sensor according to an aspect of the invention.
Figure 2:
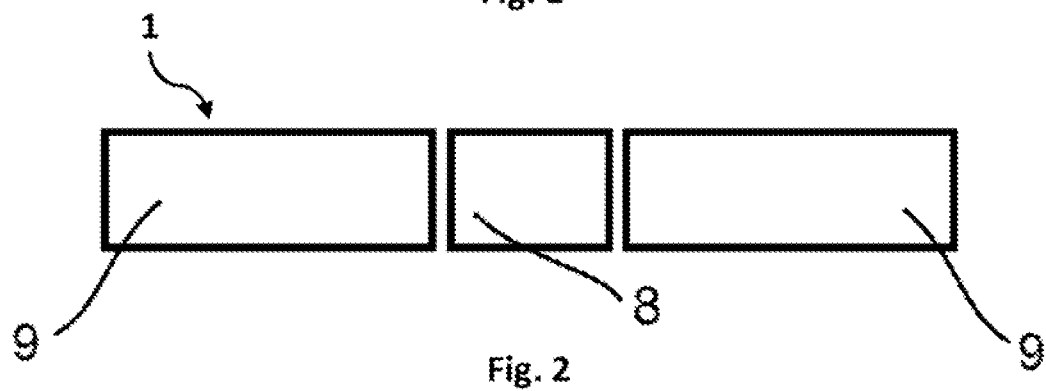
FIG. 2 shows a top-view of a SAW resonator according to an aspect of the invention.

FIG. 1 shows a surface acoustic wave (SAW) resonant sensor 1, comprising a single port surface acoustic wave (SAW) resonator. The SAW resonator comprises an interdigital transducer (IDT) 8 and at least one, such as two, reflective gratings 9. The sensor 1 is provided with a region for receiving a sample to be analysed 20, said region is in communication with the at least one reflective grating 9. The IDT 8 is not in communication with the region for receiving the sample 20. The sensor is especially suitable for bio sensing applications, and/or where the sample to be measured comprises, or is comprised within a fluid.

The sensor 1 is adapted such that the IDT 8 is not mass sensitive to the sample. The region for receiving the sample 20, and/or the sample, is shielded, that is, it is not in communication with the IDT 8. Further, in the sensor 1, the sample to be measured does not contact the IDT 8. Not in communication as used herein refers to the sample not being in acoustic communication nor electric communication with the IDT 8. That is, the IDT 8 is separated acoustically and electrically from the region for receiving a sample 20. This surprisingly enables reliable measuring of a variety of samples, especially liquid, viscous, and/or conductive samples. In some of the aspects disclosed herein, the sensor further comprises a fluidic layer 2 adapted to inhibit the ingress of the sample to be tested to the IDT 8.

The region for receiving the sample 20, and/or the sample, may be confined to the at least one reflective grating 9.

Confining the region for receiving the sample 20, and/or the sample, to the at least one reflective grating 9, has traditionally not been attempted as reflectors in classic one-port resonators do not contain a lot of energy, but serve to reflect and confine the energy to the resonator IDT. Most sensitivity comes from mass loading of the IDT, reflectors are only to a very minor part involved in the sensing, as they do not contain much energy.

The SAW resonator is provided on a piezoelectric substrate 6. The SAW resonator is provided on a first surface 7 of the piezoelectric substrate 6. The first surface 7 is adjacent to, and in communication with the fluidic layer 2. The SAW resonator is also in communication with the fluidic layer 2.

The single port SAW resonator, formed on the first surface 7 of the piezoelectric substrate 6, comprises an IDT 8 and at least one, such as two, reflective gratings 9. The reflective gratings 9 are provided on laterally opposing sides of the IDT 8, The single port SAW resonator is provided with a single IDT 8, that is, not a plurality of IDTs. The sensor 1 is not provided with an input and output IDT pair.

The IDT 8 is formed by a plurality of metallic thin film members 81, such as bars, arranged in an array. The thin film members 81 of the IDT 8 are arranged in substantially parallel alignment to each other. The IDT 8 has a longitudinal axis which is substantially parallel with longitudinal axis of alignment of the thin film members 81 of the IDT 8. The array of thin film members 81 of the IDT 8 extends laterally towards the reflective gratings 9.

Figures 4A, 4B, 4C:
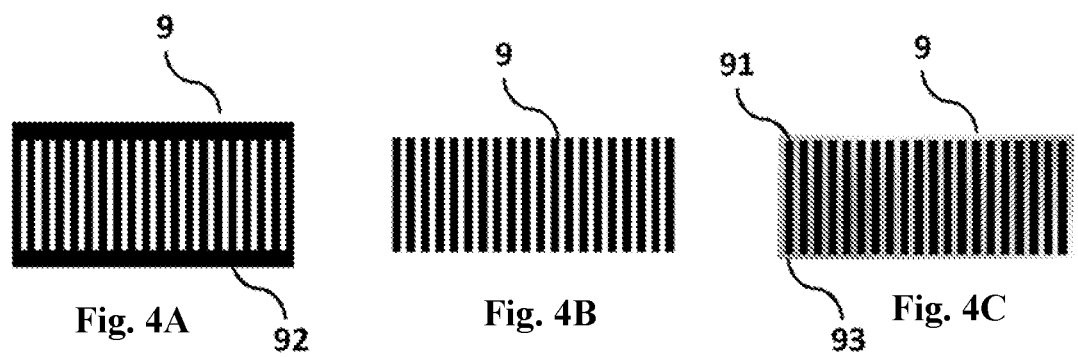
FIG. 4A-C show a top-view of reflective gratings according to aspects of the invention.
Figure 5:
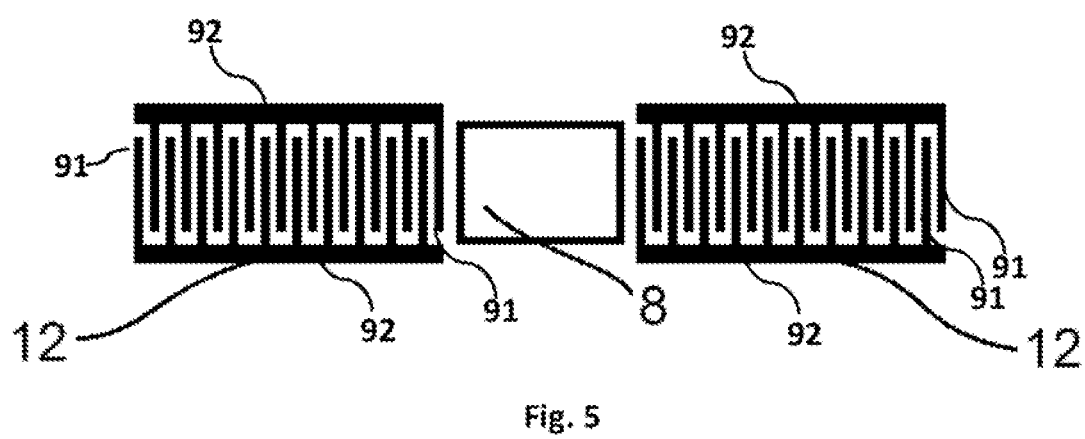
FIG. 5 shows a top-view of a SAW resonator according to an aspect of the invention.

The reflective gratings 9 are also formed by a plurality of metallic thin film members 91, such as bars, arranged in an array. The thin film members 91 of the reflective gratings 9 are arranged in substantially parallel alignment to each other. The array of thin film members 91 of the reflective gratings 9 extends laterally in alignment with the lateral axis of the IDT 8. Each of the thin film members 91 of the reflective gratings 9 extend substantially perpendicular to the alignment of the array. As shown in FIGS. 4 and 5, the thin film members 91 of the reflective gratings 9 may be thin, substantially rectangular members. The plurality of members 91 are arranged having their longitudinal axis substantially parallel.

The thin film members 81, 91 of the IDT 8 and the reflective gratings may be described as being a periodic strip grating.

The thin film members 81, 91 of the IDT 8 and the reflective gratings 9 may comprise a suitable metal patterned on the first surface 7 of the piezoelectric substrate 6. Such suitable metals include for example, Au, Pt, Al, Cu. The thin film members 81, 91 may be formed by a plurality of deposited metals, for example, the thin film members 81, 91 may comprise a first adhesion layer of Ti, a second load layer of Au, and a final adhesion and capping layer of Ti. The provision of the adhesion layers increases adhesion of any subsequently provided layers.

Figures 3A, 3B, 3C:
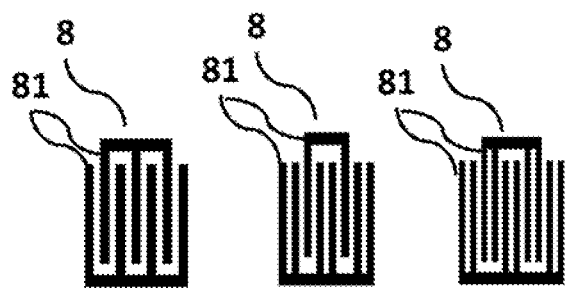
FIG. 3A-C show a top-view of an interdigital transducer (IDT) according to aspects of the invention.

As can be seen in FIG. 3A, the array of thin film members 81 of the IDT may be arranged such that adjacent thin film members form pairs of electrodes. Each thin film member 81 is electrically isolated from its adjacent member. Every second thin film 81 member in the array is electrically connected. A repeating interval of electrodes is thus formed. Opposing electrodes are adjacent to one another.

The thin film members 81, 91 of the IDT 8 and the reflective gratings 9 may be arranged in a row.

As shown in FIG. 3B, the electrode design of the MT 8 may be arranged such that at least two adjacent thin film members 81 are electrically connected. At repeating intervals, interposed between the groups of at least two electrically connected thin film members 81, an opposing electrode is provided. As shown in FIG. 3C, the opposing electrode may be itself a group of at least two thin film members 81. The arrangement shown in FIG. 3C is especially suitable when the reflective grating 9 is used as a capacitor.

The IDT 8 may have a periodical array of thin film members 81 with a pitch $p_0 \approx V_{SAW}/(2f_0)$, where $V_{SAW}$ is the phase velocity of the surface acoustic wave, while f0 is the resonance frequency.

The thin film members 91 of the reflective gratings 9 form a periodic grating structure with a pitch of $p_0$ as described above. The thin film members 91 of the reflective gratings may be electrically connected as shown in FIG. 4A. In FIG. 4A each of the thin film members are connected at their first and/or second ends by a thin film member 92 arranged perpendicular to the thin film members 91, and connecting each thin film member 91 of the reflective grating 9. As shown FIG. 4B the thin film members 91 may be non-electrically connected as shown in FIG. 4B. In FIG. 4C the members are not connected by an additional thin film member 92, or members 92, as shown in FIG. 4A, but are rather connected by a thin conducting layer 93 at least partially, such as fully, covering the plurality of thin film members 92. In the arrangement shown in FIG. 4C the thin conducting layer 93 is arranged over the thin film members 91 of the reflective grating 9. The thin conducting layer 93 may be in the region for receiving a sample 20.

In the arrangement of reflective gratings 9 shown in FIG. 5 a First plurality of thin film members 91 forms a first electrode. Interposed between the adjacent members of the first plurality of thin film members 91, a second plurality of thin film members 91, forming an opposing electrode is provided. In such an arrangement every second thin film member 91 is electrically connected. Adjacent thin film members 91 are not electrically connected. Therein, adjacent thin film members 91 form an electrode pair. The first plurality of thin film members is connected by a thin film electrode 92 provided at either the first or the second end of the members. The second plurality of thin film members 91, forming the opposing electrode, is connected via a thin film electrode 92 provided at the opposite end of the thin film members with respect to the first plurality. Such an arrangement forms a capacitor at the interface between the at least one microfluidic chamber 3 and the SAW resonator. The reflective gratings 9 may be considered to be arranged interdigitally, that is, in an interdigital fashion. Via such an arrangement the interdigitated reflective gratings 9 may be used for low-frequency impedance spectroscopy measurements and high frequency surface acoustic wave measurement as described below. Low frequency in this respect means in the range of from about 10 Hz to around 10 MHz.

Figure 12:
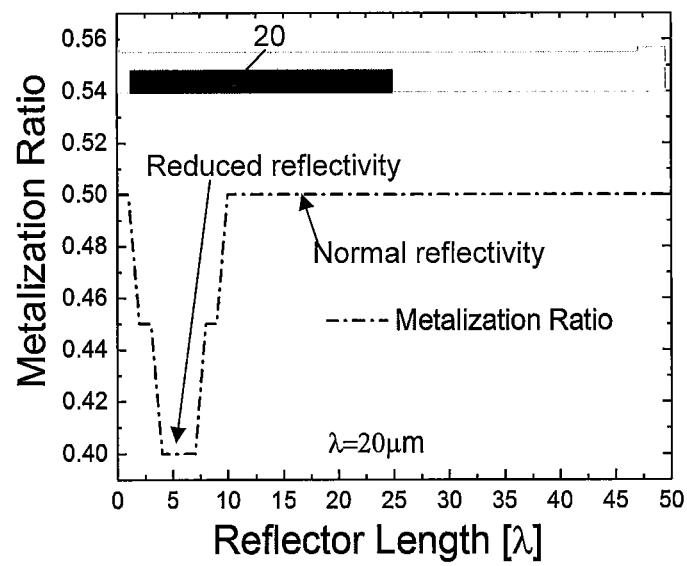
FIG. 12 shows a chart of the metallisation ratio along the length of the reflective grating to achieve an portion of reduced reflectivity adjacent to two areas of normal reflectivity to increase the energy available adjacent to the region for receiving a sample.
Figure 13:
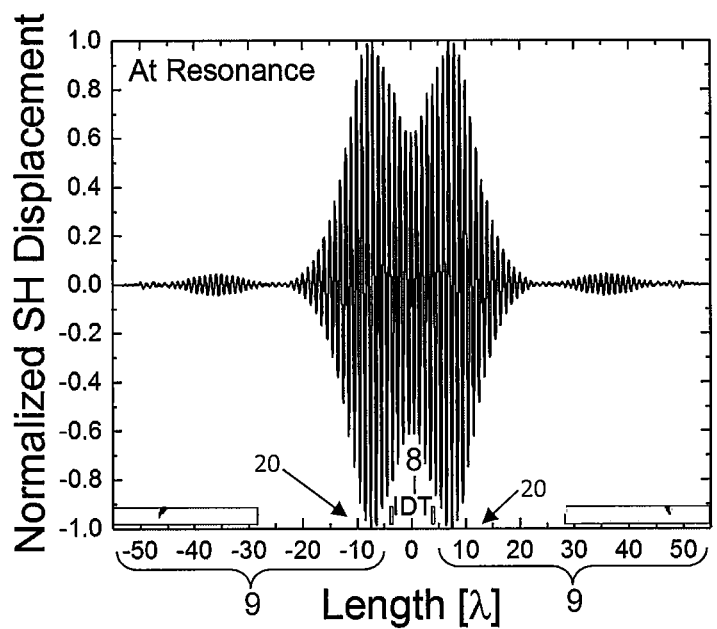
FIG. 13 shows a simulation of the waves present at resonance where the local maxima are present in the region for receiving a sample.

The at least one reflective grating 9 may be designed such that energy at resonance is increased within a portion of the reflective grating 9 adjacent the region for receiving the sample 20. This may be achieved by reducing the reflectivity to transmitted waves of a portion of the at least one reflective grating 9 relative to adjacent portions. That is, a portion of low reflectivity is provided between two portions of normal or increased reflectivity. One technique for reducing the relative reflectivity of a portion of the at least one reflective grating 9 is to decrease the metallisation ratio of the low reflectivity portion. Such a design is shown in FIG. 12. It can be seen that the metallisation ratio is reduced at a portion along the length of the reflective grating. During the provision of a high frequency signal, such as at resonance, a local maxima is formed at the portion having a reduced metallisation ratio. The waves transmitted by the IDT 8 may be considered trapped in this portion of reduced reflectivity. This local maxima increases the energy available in the at least one reflective grating 9 and thus increases sensing performance. FIG. 13 shows a simulation of energy at resonance on a sensor 1 having two reflective gratings each with a portion of reduced reflectivity. Reducing the reflectivity of a portion may be achieved by reducing the width of the strips in the low reflectivity portion of the grating, thereby reducing the metallisation ratio, by reducing the thickness of the strips in the low reflectivity portion of the grating, or similar techniques known in the art. A sensor with reflective gratings each having a low reflectivity portion as described above exhibits 100% improvement in mass sensitivity compared to uniform reflective gratings. Furthermore, at antiresonance the SAW is strongly localised under the IDT 8 and the sensor exhibits a 4.2 times smaller mass-sensitivity as compared to at resonance. This enables efficient subtraction of temperature variations within the device. The portion of reduced reflectivity may be referred to as an acoustic trap as the SAWs are trapped in the low reflectivity portion.

Figure 6:
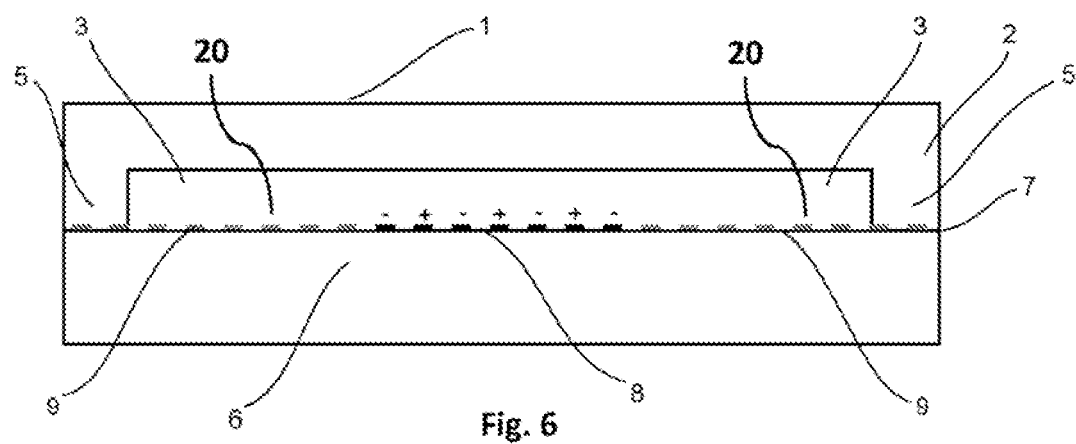
FIG. 6 shows a cross-sectional view of a sensor according to an aspect of the invention.
Figure 9:
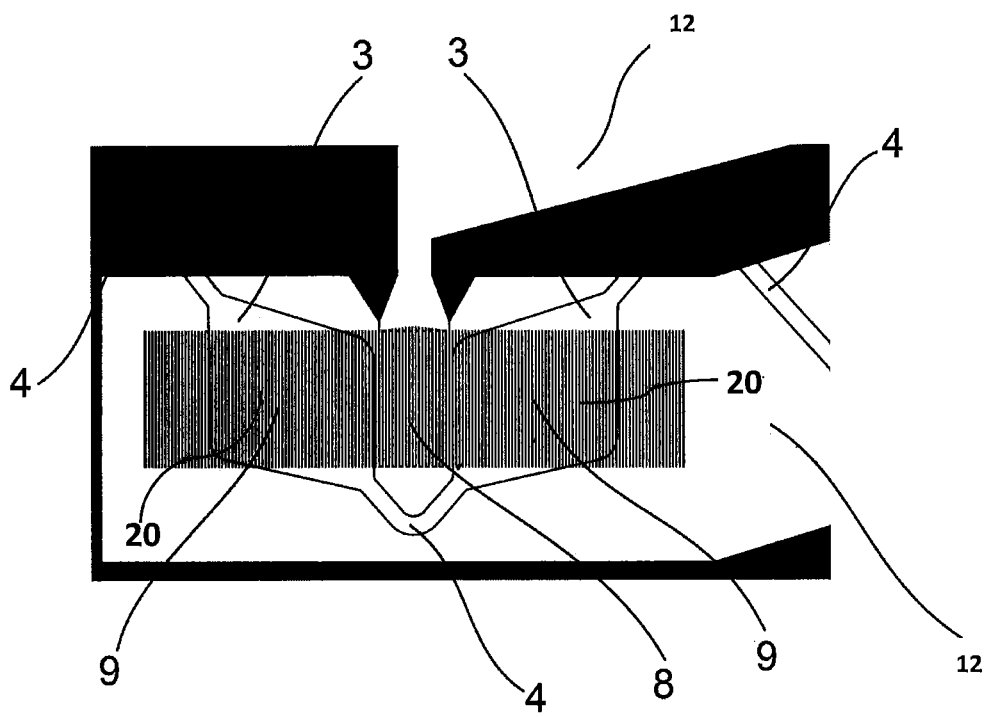
FIG. 9 shows an optical microscope image of a top-view of a SAW resonator according to an aspect of the invention.

The fluidic layer 2 is a structured fluidic layer for inhibiting the ingress of sample to the IDT 8. The fluidic layer 2 may comprise at least one microfluidic chamber 3 in communication with feeding channels 4. The fluidic layer 2 may provide a structure for the provision of sample to the region of the resonator for receiving a sample. The fluidic layer 2, and in particular the at least one microfluidic chamber 3, is arranged in communication with the one port SAW resonator. At least a portion of the at least one microfluidic chamber 3 is provided above a portion of the reflective gratings 9. The at least one microfluidic chamber 3 may be provided such that it covers a portion of the IDT 8. An example of such an arrangement can be seen in FIG. 6. The microfluidic chamber 3 in FIG. 6 extends over both the IDT 8 and partially over the reflective gratings 9. The microfluidic chamber 3 enables the provision of a sample to be tested to the SAW resonator. Two microfluidic chambers 3 arranged respectively at least partially over the reflective gratings 9 may be interconnected by a portion of the fluidic channel 4. The portion of the fluidic channel 4 interconnecting the microfluidic may be provided such that it, and therein fluid, does not contact the IDT 8. In FIG. 9 the portion the channel 4 is shown extending in an approximately V-shaped path between the two microfluidic chambers 3, where the base of the V-shaped path is arranged longitudinally distal to the IDT 8.

As shown in FIG. 1, the fluidic layer 2 may be provided with two microfluidic chambers 3, at least a portion of each of which is provided above a respective portion of the reflective gratings 9.

The fluidic layer 2 may be provided with a region acting as a protective cap 5 which is in communication with and ensures that neither the microfluidic chambers 3, nor the feeding channels 4 are in communication with the IDT 8. The protective cap 5 is provided adjacent to the at least one microfluidic chamber 3. The protective cap may be provided adjacent and between two microfluidic chambers 3.

The fluidic layer 2 may be formed by a polymer, glass or any suitable known material for the provision of a structured fluidic layer. The fluidic layer 2 in the sensor 1 as described in the experimental section comprise the polymer polydimethylsiloxane (PDMS).

In the arrangement shown in FIG. 7A an air gap 10 is provided in the protective cap 5. The air gap 10 is provided by the provision of a recess in the protective cap 5. That is, the protective cap 5 is not in direct contact with the IDT 8 such that a region of space is provided above the IDT 8, This air gap 10 reduces SAW damping in the IDT 8, Walls 51 of the protective cap 5, defining the air gap 10, are provided at the periphery of the IDT 8.

Whilst the description has focused on a sealed system where a sample to be measured is provided via the microfluidic chambers 3 and microfluidic channels 4 this is not necessary for the sensor 1 to function. An open arrangement is shown in FIG. 713. In such an arrangement the IDT 8 is protected from the ingress of sample by the protective cap 5. In the arrangement shown in FIG. 9, the microfluidic compartments 3 have been removed such that the reflective gratings 9 can be accessed from above, without necessitating fluidic channels 4 for the provision of a sample.

As can be seen in FIG. 8 an interlayer 11 may be provided above and in communication with the SAW resonator. The interlayer may have a thickness of less than about $2 \times p_0$, less than $p_0$, or about $0.6 \times p_0$. The interlayer 11 may comprise $SiO_2$. The interlayer 11 promotes bonding of the of the fluidic layer to the SAW resonator, passivates the electrodes of the IDT 8 and the reflective gratings 9, and surprisingly reduces possible thermal drift of the sensor 1. The interlayer 11 also supports wave guiding and thereby improves sensing performance. The interlayer 11 uniformly covers the whole SAW resonator, That is, the interlayer 11 is not patterned to reveal either the IDT 8 or the reflective grating 9.

The piezoelectric substrate 6 comprises either a bulk piezoelectric crystal, for example, $LiTaO_3$, $LiNbO_3$, Quartz etc. or thin piezoelectric film composite substrate formed by a piezoelectric thin film layer, for example, ZnO, AlN, $LiTaO_3$, $LiNbO_3$, PZT etc. deposited or transferred on top of a non-piezoelectric bulk substrate, for example, e.g. Si, Sapphire, Fused Silica; YAG etc. The substrate may be a Y-cut substrate having a rotation of between about 30° and about 50° around the Y-axis. Such as Y-cut $LiNbO_3$, 36° Y-cut $LiNbO_3$, 41° Y-cut $LiNbO_3$, 64° Y-cut $LiNbO_3$, 163° Y-cut $LiNbO_3$, 36° Y-cut $LiTaO_3$, 42° Y-cut $LiTaO_3$, The substrate is suitable for propagation of surface acoustic waves.

The sensor 1 may be provided with electrical contacts 12, or contact pads 12, for the provision of a signal to the SAW resonator. A first contact 12 may be arranged in communication with the IDT 8. A second contact 12 may be arranged in communication with the at least one reflective grating 9. If the SAW resonator is provided with two reflective gratings 9, then the second contact may be arranged in communication with both reflective gratings 9.

The sensor 1 as described herein enables one-port sensing measurements at high frequencies. High frequencies may be around or greater than 100 MHz, Such measurements include measurement of shift in resonance frequency, change in amplitude of admittance and conductance near resonance, change in phase of the admittance near resonance, changes in resonator signal time of decay etc. High frequency signals may be provided to the IDT 8.

Low frequency signals may be provided to the at least one reflective grating 9. Low frequency signals may be from around 10 Hz to about 100 Hz. The low frequency signals may be used to measure complex electric impedance of the sample, High frequency and low frequency signals may be provided substantially simultaneously, that is concurrently. The reflective gratings provided with low frequency signals enable electrical impedance spectroscopy.

The sample to be measured may be a liquid sample. The liquid sample may be electrically conductive.

The principle of operation allows the use of this device in physical, chemical and biological sensing applications. The devices 1 has a small form factor, uses small volumes of samples and provides for robust integration in to a sensing array.

Also provided herein is a sensor assembly comprising a plurality of devices 1 according to that described above. The sensor assembly may comprise a single fluidic layer 2. The plurality of regions for receiving a sample in each of the respective devices in the sensor assembly may be accessible by a plurality of microfluidic chambers 3 provided in the single microfluidic layer 2. The microfluidic channels 4 present in the fluidic layer 2 may be arranged in a fluidic gradient generator as is known in the art. In such a way simultaneous and parallel analysis of a variety of samples can be achieved with the sensor assembly. The complexity of measurement of a variety of samples is thus greatly reduced.

Also provided herein is a method for physical, biological, and/or physical measurement comprising: providing a sample to be tested to a sensor 1 according to the description above. The method further comprises providing a high frequency signal of greater than about 100 MHz to the IDT 8, and/or providing a low frequency signal of about 10 Hz to about 10 MHz, to the interdigitated reflective grating 9. Thereafter, measuring at least one of: shift in resonance frequency, change in amplitude of admittance and conductance near resonance, change in phase of the admittance near resonance, changes in resonator signal time of decay, and/or changes in complex electrical impedance in the low frequency range. As described above high frequency signals are suitable for measuring frequency shifts of resonance in the resonator. The low frequency signals can be used to measure complex permittivity of the sample to be tested. The low frequency signals are generally employed when the reflective gratings 9 are arranged interdigitally and when the impedance of the SAW resonator is measured. The high frequency signals and low frequency signals may be provided concurrently, such as substantially simultaneously. The at least one reflective grating 9 is specifically designed to be capacitive such that the provision of low frequency signals enables measuring of parameters not possible in previous SAW based sensor systems.

Figure 14:
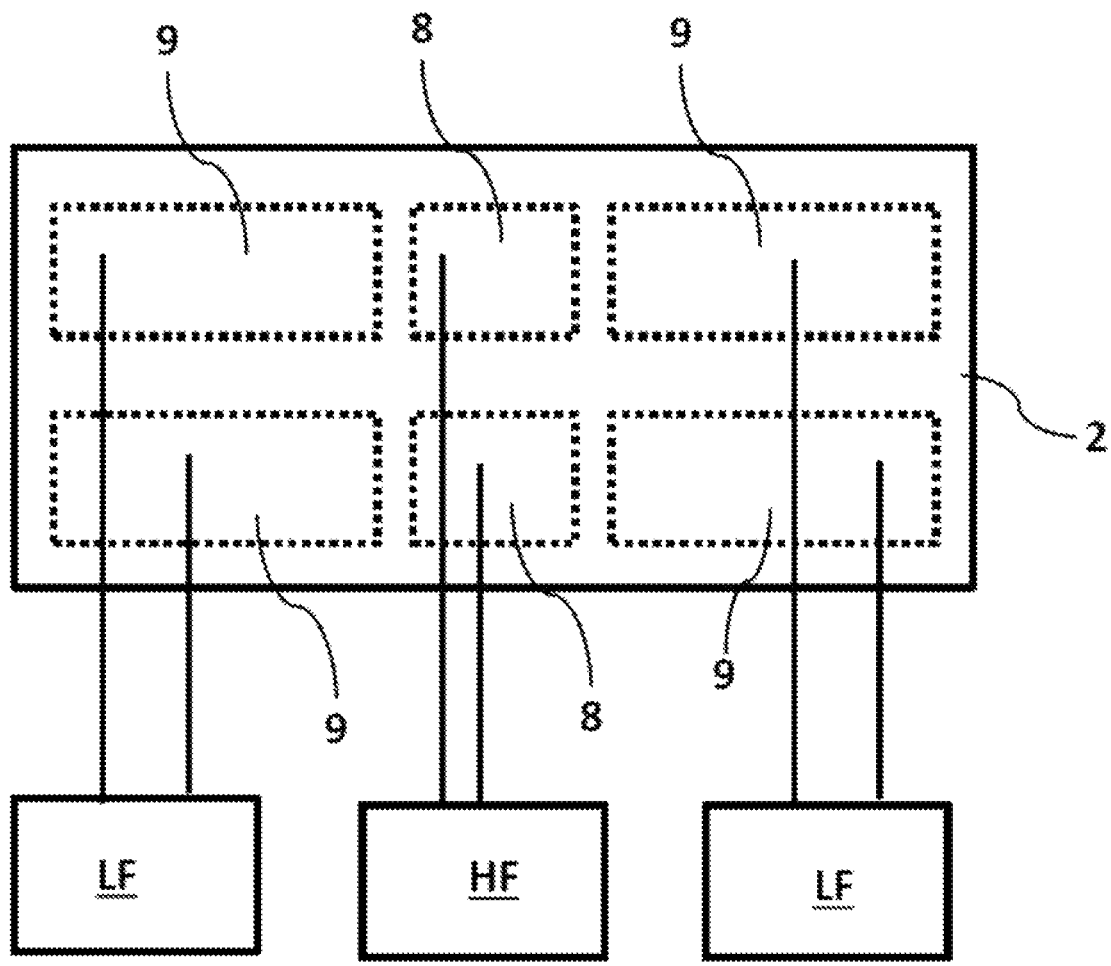
FIG. 14 shows a top-view of a SAW resonator sensor according to an aspect of the invention.

FIG. 14 shows a top view of a SAW resonator sensor according to an aspect of the invention. As shown, the SAW resonator sensor includes two IDTs 8 and four reflective gratings 9 with one fluidic layer 2 on a substrate. In the configuration shown, the IDTs 8 are provided with a high frequency signal from a high frequency electrical signal generator HF signal and the reflective gratings 9 are provided with a low frequency signal from a low frequency electrical signal generator LF. The high and low frequency signals are within the ranges discussed above. Therefore, FIG. 14 shows an assembly with two parallel SAW resonant sensors like the one shown and described with respect to FIG. 1.

Materials and Fabrication

Substrate and SAW Resonator Fabrication

A typical surface acoustic resonant device, as disclosed here, is fabricated on a 4" (Ø) 525 µm thick Y-cut X-propagation black LiNbO$_3$ piezoelectric substrate (Precision Micro-Optics Inc., USA) using standard lift-off lithography. First, the substrate is cleaned with oxygen plasma (PS300AL PC, PVA TePla AG, Germany), followed by sonication in mr-Rem 400 remover (Micro Resist Technology GmbH, Germany), rinsed in ethanol and deionized water (DI), and dried with N$_2$ stream. The substrate is then primed with HMDS (MicroChemicals GmbH, Germany) vapor (QS V 200 BM, solar-semi GmbH, Germany). Following that the image reversal photoresist (Merck AZ 5214 E, MicroChemicals GmbH, Germany) is applied by spin-coating (resulting thickness of 1.5 him) and baked at 110° C. for 1 minute. Pattern transfer into the resist is done by laser direct writer ($\lambda$=405 nm, exposure dose 24 mW, DWL 2000 by Heidelberg Instruments Mikrotechnik GmbH, Germany). Reversal bake at 125° C. for 1 minute and flood exposure of the resist ($\lambda$=365 nm, 60 seconds at 6 mW/cm$^2$, MA/BAG by SÜSS MicroTec AG, Germany) is followed by development step in Merck AZ 351B general purpose developer (MicroChemicals GmbH, Germany) for 35 seconds (1-part developer to 5 parts DI). To remove residues of the photoresist and HMDS, an O$_2$ plasma descumming step is performed (30 seconds at 50 W, 250 mTorr, 10 SCCM, Batch-Top m/95 by Plasma-Therm LLC, USA). Metallization by e-beam evaporation (PVD225, Kurt J. Lesker Company Ltd., USA) consists of 25 mu Ti adhesion layer, 260 mu Au load and 15 mu Ti cap layer. The top Ti layer allows for native oxidation of the material to form TiO$_2$, that significantly improves the adhesion of SiO$_2$ passivation and prevents its delamination in case when bare Au is used without any capping. Lilt-off of excess metallization is done in acetone using sonication followed by a washing step in mr-Rem 400 remover, ethanol and DI. 100 mu of SiO$_2$ passivation layer is deposited by reactive magnetron sputtering (MS 150, FHR Anlagenbau GmbH, Germany) in order to protect the electrodes from corrosion and short-circuiting effects, as well as to increase bonding energy between the device and a PDMS slab that contains the micro fluidic channels. To etch the contact pad 12 opening another lithography step is performed. The substrate is again treated with HMDS vapor, and approximately 1.2 µm of Merck AZ 1512 HS (MicroChemicals GmbH, Germany) photoresist is subsequently applied via spin-coating, and baked at 100° C. for 1 minute. Definition of an etch mask is done with direct laser writing ($\lambda$=405 nm, exposure dose $\approx$24 mW), followed by a development step in Dow Microposit MF CD-26 developer (MicroChemicals GmbH, Germany) for 45 seconds. An additional descumming step in O$_2$ plasma is then performed to remove residues of the photoresist and HMDS. Openings in SiO$_2$ are dry etched in NF$_3$ plasma (Plasmalab System 100, Oxford Instruments plc, UK). The etch mask is then removed by sonication in mr-Rem 400 remover, ethanol and DI wash. In the final step the chips are diced and packaged.

Fluidic Layer Fabrication

A microfluidic analyte delivery system is fabricated in PDMS, using standard soft lithography. The master mould is fabricated by applying approximately 50 µm of MicroChem Corp. SU-8 3035 negative photoresist (Micro Resist Technology GmbH, Germany) on a 4" (Ø) 525 µm thick Si wafer (MicroChemicals GmbH, Germany) via spin-coating (GYR-SET® equipped RCD8 by SÜSS MicroTec AG, Germany). Prior to resist application, the substrate is cleaned using buffered oxide etch solution (to remove the native oxide and to improve wetting of the polymer), rinsed in DI and blow-dried in an N$_2$ stream. Soft-baking is performed at 95° C. for 15 minutes. Subsequently edge beads are removed by solvent jetting on the periphery of a wafer. Microfluidic circuits are defined by photolithography (2=365 nm, 42 seconds at 6 mW/cm$^2$, MA/BA 6 by SÜSS MicroTec AG, Germany) using vacuum contact exposure. To finalize resist polymerization, it is post-baked for 1 minute at 65° C. and 5 minutes at 95° C. Development follows, using mr-Dev 600 (Micro Resist Technology GmbH, Germany) for 8 minutes. An additional descumming step in O$_2$ plasma is performed to remove residues of the photoresist, followed by a hard baking step to reduce pattern stress and remove cracks in polymer, employing temperature ramping of the wafer to 200° C. (about T$_g$ of polymerized SU-8) and back to room temperature. To passivate the surface of the master mould, trichloro(1H,1H,2H,2H-perfluorooctyl)silane (Sigma-Aldrich Co. LLC, USA) vapor is used. Finally, silicon elastomer prepolymer is prepared from a Dow SYLGARD® 184 kit (Sigma-Aldrich Co. LLC, USA), cast in a 10:1 base/catalyst mixture, and cured at 80° C. for an hour. The cured PDMS replica is released from the master mould for post-processing that includes cutting out of individual chips and punching inlets and outlets.

Preparation and Bonding of Layers

Thereafter both the resonator chip and PDMS structure are exposed to O$_2$ plasma for 45 seconds (0.2 mBar, 30 SCCM, 100 W, Atto Plasma Chamber, Diener Electronic GmbH, Germany), To align the two parts, Milli-Q water (18.2 M$\Omega$) is applied onto the surface of the SAFE sensor, preventing immediate bonding with the PDMS chip when brought into contact. Alignment is performed under a stereo microscope. Once aligned, the complete assembly 1 is rested for 10 minutes, so that the Milli-Q water can dry and allow for delayed covalent bonding of the components. The process if finalized by a baking step at 80° C. for 10 minutes, after which the sensor 1 are inspected and packaged.

Experimental Section

A Fabricated Sensor 1

A sensor 1 was prepared according to the fabrication methods described above. In FIG. 9, a 2D top view image of a 185 MHz Surface Acoustic Wave resonant sensor 1 is shown. A PDMS layer with microfluidic compartments 3 and channels 4 feeding the compartments, is oxygen plasma-bonded over the one-port SAW resonator employing the SH-SAW mode propagating towards the X-direction of the Y-cut LiNbO$_3$. A specific arrangement between the feeding channels 4 and the microfluidic chambers 3 is shown. In this specific embodiment, a high electromechanical coupling SH-SAW mode is confined to the surface through the loading effect of the periodic strip gratings. Both the IDT 8 and the reflective gratings 9 are formed by a periodical array of 270 nm thick Au strips with a pitch $p_0$=10 µm and strip width of about $p_0/2$. The number of strips in the IDT 8 is $N_t$=21, the number of strips in each reflector is $N_r$=69, from which 49 are overlapping with a microfluidic chamber, while the device aperture is W=40*p0. The characteristic area of each chamber is about 500 µm×500 µm, while the depth of each chamber and connecting cannel is about 50 µm. The total area of the fabricated device is about 1.6 mm×0.4 mm, excluding the electrical "contact pads". It is noted that device area and container area scales down with increasing resonant frequency.

Demonstration of SH-SAW Confinement to the Surface by the Said Periodic Strip Gratings Comprising the IDT (8) and the Reflective Gratings (9)

Figure 10:
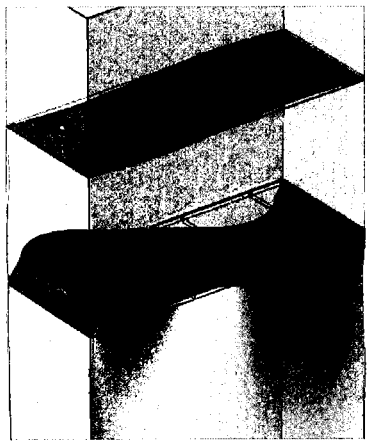
FIG. 10 shows a simulation of acoustic wave displacement of SH-SAW propagating beneath a periodic Au grating along the X-axis of Y-cut piezoelectric substrate.

To show the principle of energy confinement near the interface between the periodic strip gratings and the liquid, a Finite Element Method (FEM)-simulation of the SH-SAW displacement was performed. A periodic strip grating along the X-axis on the surface of Y-cut $LiNbO_3$ is considered to have 270 nm thick. Au strips with pitch $p_0$=10 µm. As evident from FIG. 10, the SH-SAW is sufficiently trapped to the surface of the piezoelectric crystal, while decaying into the water al about 40 nm characteristic decay length $\delta(\eta/(\rho\pi f_0))^{0.5}$. $\eta$ is the shear viscosity of the liquid, $\rho$ the density of the liquid and $f_0$ the SH-SAW resonance frequency.

Characterization of the Fabricated Device

Figure 11:
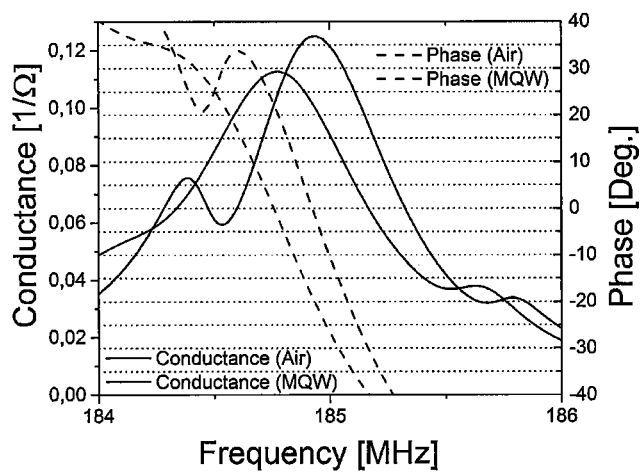
FIG. 11 shows the close-in resonance conductance (solid lines—units in 1/Ω and the close-in resonance phase of admittance (dashed lines—units in Degrees) of the fabricated Surface Acoustic Wave resonant integrated in a micro fluidic sensor. The black curves represents the measurement of the sensor with air in microfluidic compartments. The red curves represent the measurement of the sensor with deionized (Milli-Q grade) water in the micro fluidic compartments.

This embodiment describes a method for close-in resonance characterisation of the fabricated device. Sensitivity towards exposing the sensor to a liquid is demonstrated while retaining the characteristic device performance features. In FIG. 11, close-in resonance responses (regarding conductance and phase of admittance, respectively) of the fabricated device are shown as measured in containers filled with air and water, respectively. The resonance frequency $f_0$ is about 184.9 MHz. Relative frequency shifts of the conductance peak and the zero value of the admittance phase, of about 914 ppm is observed as a result of water loading, accompanied with only 10% decrease of conductance peak magnitude. The device quality (Q) factor dropped from 250 to 200 under water loading. The latter determine a device Q×f product in water of about $3.6 \times 10^{10}$ Hz which is twofold larger than that of a typical QCM. The phase of the admittance demonstrates sufficient linearity in the vicinity of its zero point. The conductance peak at the resonance has been measured to be about 0.125 1/Ohm, thus demonstrating a low device electrical impedance of about 8 Ohms at resonance. This further enables sensor design with reduced number of strips in IDT 8, while keeping impedance at the resonance frequency close to 50 Ohms.

Conclusions from Experimental Section

One-port resonant sensor platforms as described herein are characterized by lower toss of signal, thus maintaining a moderate to low electric impedance at resonance. The device Q×f product (Q— the Q factor, f— the resonance frequency) in liquid remains on the order of $1.710^{10}$ Hz, while the acoustic wave transducer is naturally protected from the short-circuiting effect of the liquids. Sensor response is represented by changes in resonance frequency, phase, resonator dissipation, or combinations thereof.

The thin film technological platform has demonstrated sensing resolution comparable to QCM, while offering robust integration in sensing arrays and small sample volumes. The obtained benefits arise from the ability of one-port measurement, and the high frequency of operation which led to significantly reduced size, as compared to QCM.

The integrated resonant SAW sensor, presented in this invention, is a high frequency equivalent of the QCM in view of the ability to perform as one-port resonator loaded with liquid and biochemical deposits on the sensing surfaces.

Although, the present invention may have been described above with reference to specific embodiments, it is not intended to be limited to the specific form set forth herein. Rather, the invention is limited only by the accompanying claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A surface acoustic wave (SAW) resonant sensor for measuring a sample, the sensor comprising:
   a one-port SAW resonator, including an interdigital transducer IDT; and
   at least one reflective grating; wherein
   the sensor is provided with a region for receiving the sample, said region being above and in direct contact with the at least one reflective grating, and
   the IDT is separated acoustically and electrically from the region for receiving the sample such that the IDT is not mass sensitive to the sample.

2. The surface acoustic wave resonant sensor according to claim 1, wherein the SAW resonator is provided with two reflective gratings arranged either side of the IDT.

3. The surface acoustic wave resonant sensor according to claim 1, wherein the at least one reflective grating is interdigitated such that a capacitor is formed at the interface of the region for receiving the sample and the reflective grating.

4. The surface acoustic wave resonant sensor according to claim 1, wherein the at least one reflective grating is adapted to receive a low frequency electric signal of from about 10 Hz to about 10 MHz.

5. The surface acoustic wave resonant sensor according to claim 1, wherein the sensor further comprises a fluidic layer in communication with the SAW resonator, wherein the fluidic layer is provided with a protective cap adapted to inhibit the ingress of the sample to be tested to the IDT, such that sample does not contact the IDT.

6. The surface acoustic wave resonant sensor according to claim 5, wherein the fluidic layer further comprises at least one microfluidic chamber arranged in communication with the at least one reflective grating such that said region for receiving a sample is formed by the at least one microfluidic chamber.

7. The surface acoustic wave resonant sensor according to claim 5, wherein the protective cap in the fluidic layer is provided with a recess such that an air gap is formed above the IDT.

8. The surface acoustic wave resonant sensor according to claim 1, wherein the at least one reflective grating comprises a plurality of thin film members arranged, periodically and substantially parallel to each other.

9. The surface acoustic wave resonant sensor according to claim 8, wherein the plurality of thin film members of the reflective gratings are arranged at a pitch of half a surface acoustic wavelength at resonance.

10. The surface acoustic wave resonant according to claim 1, wherein the SAW resonator is provided on a first surface of a piezoelectric substrate.

11. The surface acoustic wave resonant sensor according to claim 1, wherein an interlayer is provided above and in communication with the SAW resonator.

12. The surface acoustic wave resonant sensor according to claim 1, wherein the SAW resonator employs SH-SAW and/or Leaky SAW propagating along the X-axis of the piezoelectric substrate being selected from one of, Y-cut LiNbO3, 36° Y-cut LiNbO3, 41° Y-cut LiNbO3, 64° Y-cut LiNbO3, 163° Y-cut LiNbO3, 36° Y-cut LiTaO3, 42° Y-cut LiTaO3.

13. The surface acoustic wave resonant sensor according to claim 1, wherein the sample is a liquid sample.

14. A sensor assembly comprising a plurality of surface acoustic wave resonant sensors according to claim 1.

15. The sensor assembly according to claim 14, wherein the sensor assembly comprises a single fluidic layer.

16. A method for physical, biological, and/or chemical measurement comprising:

providing a sample to be tested to a surface acoustic wave resonant sensor according to claim 1, providing a high frequency signal of greater than about 100 MHz to the IDT, and/or providing a low frequency signal of about 10 Hz to about 10 MHz, to the at least one reflective grating, measuring at least one shift in resonance frequency, change in amplitude of admittance and conductance near resonance, change in phase of the admittance near resonance, changes in resonator signal time of decay, and/or changes in complex electrical impedance of the SAW resonator.

17. The method according to claim 16, wherein the high frequency signal is provided to the IDT and the low frequency signal is provided to the at least one reflective grating concurrently.

18. A system for measuring a sample comprising:

a surface acoustic wave resonant sensor according to claim 1, a high frequency electrical signal generator for providing a high frequency signal of greater than about 100 MHz to the IDT, a low frequency electrical signal generator for providing a low frequency electrical signal of from about 10 Hz to about 10 MHz to the at least one reflective grating.

* * * * *